United States Patent [19]

Chen et al.

[11] Patent Number: 5,287,596
[45] Date of Patent: Feb. 22, 1994

[54] HINGE WITH ADJUSTABLE STOP AND HOLD MECHANISM

[76] Inventors: Haw-Renn Chen; Feichu H. Chen, both of 4057 Little Hollow Pl., Moorpark, Calif. 93021

[21] Appl. No.: 824,882

[22] Filed: Jan. 24, 1992

Related U.S. Application Data

[63] Continuation of Ser. No. 563,830, Aug. 6, 1990, abandoned, which is a continuation-in-part of Ser. No. 346,347, May 1, 1989, abandoned, which is a continuation of Ser. No. 174,113, Mar. 28, 1988, abandoned.

[51] Int. Cl.$^5$ .............................................. E05D 11/10
[52] U.S. Cl. ........................................ 16/331; 16/332; 16/363; 16/376
[58] Field of Search ............... 16/332, 363, 317, 318, 16/319, 321, 334, 331, 374, 375, 376, 342, 387, 322, 329, 354

[56] References Cited

U.S. PATENT DOCUMENTS

| | | | |
|---|---|---|---|
| 521,429 | 6/1894 | Bessonette | 16/322 |
| 931,810 | 8/1909 | Tapling | 16/329 |
| 976,392 | 11/1910 | Paynter | 16/317 |
| 1,508,013 | 9/1924 | DeWaters | 16/351 |
| 1,564,611 | 12/1925 | Mountford et al. | 16/322 |
| 1,603,408 | 10/1926 | Rickenbacher | 16/331 |

FOREIGN PATENT DOCUMENTS

| | | | |
|---|---|---|---|
| 624610 | 1/1936 | Fed. Rep. of Germany | 16/329 |
| 816065 | 10/1951 | Fed. Rep. of Germany | 16/354 |
| 993508 | 11/1951 | France | 16/387 |
| 44095 | 3/1916 | Sweden | 16/317 |
| 45267 | 11/1908 | Switzerland | 16/342 |
| 26868 | of 1905 | United Kingdom | 16/374 |

*Primary Examiner*—Lowell A. Larson
*Assistant Examiner*—Carmine Cuda

[57] ABSTRACT

A universal hinge is a hinge with the capability of performing stop and hold mechanisms without installing extra stop and/or catch components on an object abutted to the universal hinge. The universal hinge comprises a hinge body, a stop mechanism, and a hold mechanism. Both the stop mechanism and the hold mechanism of the universal hinge are provided by specially shaped hinge knuckles while no extra component is needed. An alternative improvement of the universal hinge is provided by adding a specially designed self-locking spring-bushing assembly which comprises a conical spring and a step-configured ring bushing. The self-locking spring-bushing assembly complying with the stop and hold mechanisms can serve the improved universal hinge with the adjustable stop angle capability.

3 Claims, 2 Drawing Sheets

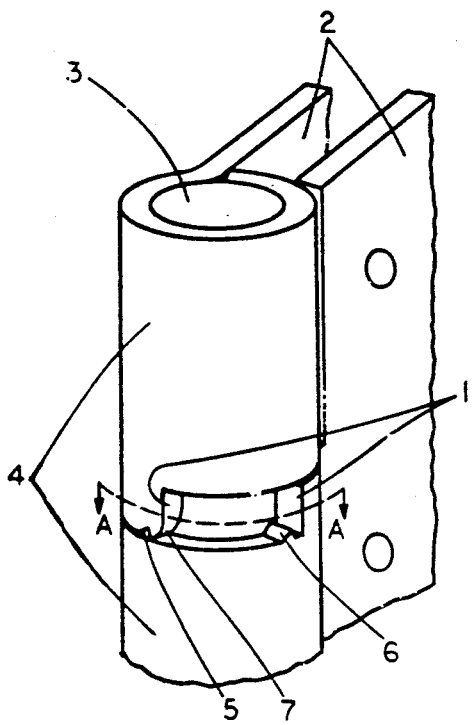
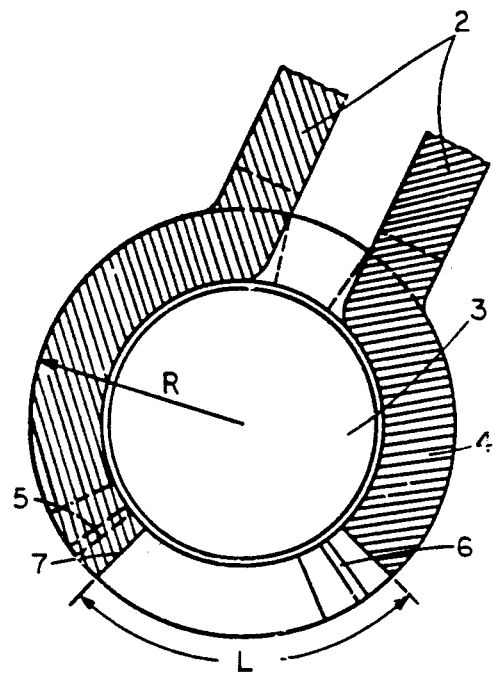
FIG. 1   FIG. 2
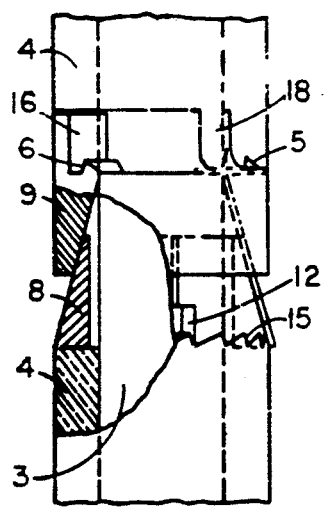
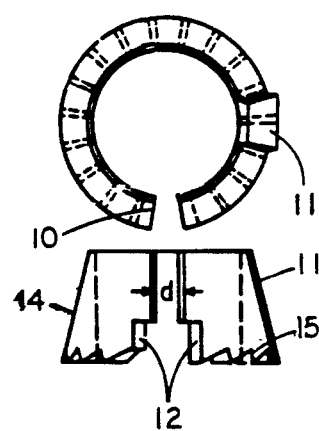
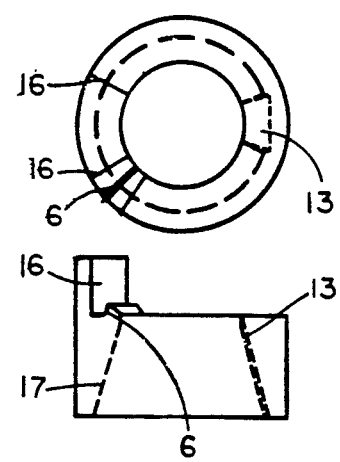
FIG. 3   FIG. 4   FIG. 5

HINGE WITH ADJUSTABLE STOP AND HOLD MECHANISM

This application is a continuation of Ser. No. 07/563,830 filed Aug. 6, 1990, now abandoned, which is a continuation in part of Ser. No. 07/346,347 filed May 1, 1989, now abandoned, which is a continuation of Ser. No. 07/174,113 filed Mar. 28, 1988, now abandoned.

BACKGROUND OF THE INVENTION

The invention is directed to a hinge having a stop mechanism, which limits the opening angle of the hinge, and a hold mechanism, which holds the hinge at the fully opened position. Thus far, several designs on the hinge with stop and/or catching functions have been proposed, such as those in the U.S. Pat. Nos. 90,500; 165,619; 2,966,697; 3,905,065; and 4,501,045. These proposed designs require either extra components or machining work for performing the stop and/or catching functions. It is substantially costly to machine the parts or to produce extra components attached to a hinge for performing the stop and/or catching functions. Due to the high cost, the use of those proposed designs is limited to specialized purposes with substantial extra budget. This disadvantage prevents these stop hinges from being popularly used in daily life.

Besides the stop and/or hold functions, the adjustable stop-angle function is an alternative improvement of the present invention which requires extra components. A design as described in U.S. Pat. No. 3,905,065 contains a stop mounted on the lower hinge part for angular adjustment about the hinge pin. However, its design involves much machining work on both hinge main body and the extra components which make it too expensive and complicated to be practical in use. The alternative improvement of the present invention can perform the same functions with only two extra innovated components and simpler machining work. Hence, it is more cost effective to use the alternative improvement of the present invention than to use the aforementioned design on the adjustable stop-angle applications.

OBJECTS AND ADVANTAGES OF THE INVENTION

Accordingly, it is the major concern of the present invention to provide economic, simple, and practical hinges with stop and/or hold features such that the convenience and comfort of using stop and/or hold hinge can be popularly spreaded. There are variety of advantages by utilizing the present invention as follows:
1) The present invention can perform stop and/or hold functions without additional components or complex physical configurations and hence is more cost effective than other hinges.
2) The present invention can provide the stop and/or hold functions regardless the locations and arrangements of the objects surrounding the article abutted to the present invention.
3) The present invention can be manufactured as simple as a conventional continuous or door hinge which does not have stop capability.
4) The present invention can further provide the adjustable stop angle capability.

Therefore, the primary object of the present invention is to provide people with economical, simple, and practical means on the hinge to achieve the stop and/or hold features. The other object of the invention is to provide the stop and/or hold hinge with a stop angle adjustment capability.

BRIEF DESCRIPTION OF THE DRAWINGS

FIG. 1 shows a partial portion of the basic configuration of the present invention.

FIG. 2 is an enlarged projectory sectional view taken along line A—A in FIG. 1.

FIG. 3 shows the overall configuration of step-configured ring bushing and conical spring (C-spring).

FIG. 4 is the projectory top view and side view of a conical-spring.

FIG. 5 is the projectory top view and side view of a step-configured ring bushing.

DETAIL DESCRIPTION OF THE EMBODIMENT

Figure 6:
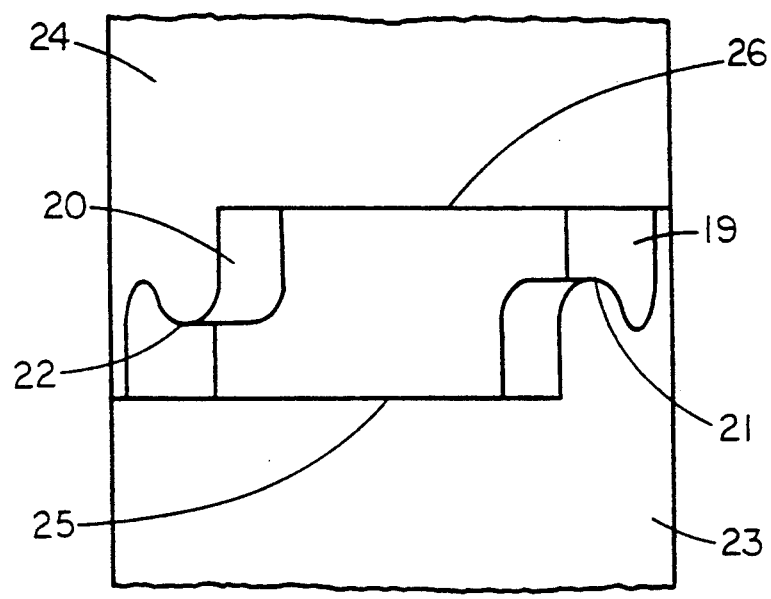
FIG. 6 is the projectory side view of the universal stop and hold feature of the present invention.

A portion of the universal hinge is shown in FIG. 1 where the hinge leaves are indicated by numeral 2, the hinge pin is indicated by 3, the hinge knuckles are indicated by 4, and the stop and hold mechanism is indicated by 1, 5, and 6. The projectory sectional view of the stop and hold mechanism along line A—A of FIG. 1 is enlarged in FIG. 2.

As can be seen in FIG. 1 and FIG. 2, the configuration of the stop mechanism consists of two vertical step edges, as indicated by 1, with same height in which each vertical step edge is formed on one of the adjacent hinge knuckle edges. The vertical step edges associating with the hinge knuckle edges form an opening slot such that the vertical step edges, 1, are farthest apart with the angular distance of L, as in FIG. 2, when the universal hinge is closed. When the universal hinge is being opened, the hinge leaves, 2, and the hinge knuckles, 4 (which are the extended portion of the hinge leaves), are angularly moving around the hinge pin, 3, in reverse angular direction such that the two vertical step edges, 1, are moving toward each other until in contact with each other. As the vertical step edges are in contact, the further rotational motion of the hinge leaves and the hinge knuckles are restricted and the stop function is performed. Hence, the stop angle of the universal hinge is determined by the locations of the vertical step edges on the adjacent hinge knuckle edges. As shown in FIG. 2, the outer radius of the hinge is R and the angular distance between the vertical step edges as the universal hinge is closed is L, then the maximum opening angle of the universal hinge is L/R.

The hold mechanism of the universal hinge comprises a convex curve with appropriate curvatures formed as an extrusion over one hinge knuckle edge within said opening slot and a matching concave curve formed on the hinge knuckle edge adjacent to the hinge knuckle edge on which the convex curve is formed. As illustrated in FIGS. 1 and 2, a bump and a notch, both have two sloped edges for generating horizontal force component, are used as a simplified example of the convex and concave curves by considering the bump and the notch as a convex curve and a concave curve, respectively, with both zero and infinite curvatures. As shown in FIG. 1 and FIG. 2, the bump and the notch are placed close to the vertical step edges on the adjacent hinge knuckle edges such that, when the universal hinge is stopped, the notch will sit over the bump to hold the hinge leaves from moving. For a better holding efficiency, the bump and the notch are shaped as an unequilateral triangle or the like and the steeper side of the bump and the notch is placed close to the vertical step edges. In addition, the height of the bump and the depth of the notch should be greater than the end play—the amount of axial movement between the hinge leaves—of the universal hinge by a reasonable amount to prevent the bump-notch pair from slipping during the holding period.

As indicated by 7, the step cutting corner adjacent to the notch is tapered, rounded, or both such that the resistence between the bump and the step cutting corner can be minimized when the hinge knuckles are pushed toward the hold position. The tapered or rounded step cutting corner can also make the effective service life time of the bump last longer. The actual shape of the step cutting corner could either be standardized or be optionally designed to fit various needs.

The configuration of a universal hinge with the feature of adjustable stop angle is shown in FIG. 3 where an additional self-locking spring-bushing assembly comprising a conical spring (C-spring), 8, and a step-configured ring bushing, 9, is installed in parallel to the hinge pin, 3, axially in between two adjacent hinges 4. A bump 6 is formed on the upper rim of the step-configured ring bushing and a matching notch 5 is formed on the adjacent hinge knuckle edge.

The conical C-spring, as shown in FIG. 4, is a ring with an axial opening cut, 10, and a conically-shaped outer surface, 14, where a teeth structure, 15, is formed on the radially wider rim of the C-spring and a key slide extrusion, 11, is axially formed along the outer surface of the C-spring. The step-configured ring bushing, as shown in FIG. 5, has two vertical step edges, 16, on the upper rim and a conical inner surface, 17, on which a key slide cut, 13, is formed axially.

To make the stop angle adjustable on the universal hinge, the self-locking spring-bushing assembly is made in a way that the C-spring outer surface has the same conical aperture angle as that of the step-configured ring bushing inner surface and the smallest radius of the conically-shaped inner surface of the step-configured ring bushing is smaller than the smallest radius of the conically-shaped outer surface of the C-spring. The self-locking spring-bushing assembly is constrained by two adjacent hinge knuckles so that the conically-shaped outer surface of the C-spring is contracted by the conical inner surface of the step-configured ring bushing such that a force component in parallel to the hinge pin is generated and this force component is pushing the step configured ring bushing upwards to contact with the adjacent hinge knuckle edge tightly. The C-spring is pushed down by the force component to couple with the adjacent hinge knuckle through the teeth on the C-spring and the matching teeth on the adjacent hinge knuckle. The step-configured ring bushing is coupled with the C-spring through the key slide extrusion, 11, on the outer surface of the C-spring and the key slide cut, 13, on the inner surface of the step-configured ring bushing. Therefore, the self-locking spring-bushing assembly acts as an extension of the hinge knuckle adjacent to the C-spring.

As shown in FIG. 3, the vertical step edge, 18, is formed on the hinge knuckle edge adjacent to the step-configured ring bushing. Since the step-configured ring bushing behaves like an extension of the coupled hinge knuckle adjacent to the C-spring, the vertical step edge on the step-configured ring and the adjacent hinge knuckle form the stop mechanism. Likewise, the notch and bump pair form the hold mechanism.

When the stop angle is to be adjusted, the C-spring needs to be raised by sticking a pin-like tool into notch 12 in FIG. 3 and FIG. 4 and pushing the C-spring against the foregoing mentioned axial force component. Once the C-spring is raised by at least the depth of the teeth formed on the wider rim of the C-spring, the coupling between the adjacent knuckle and the C-spring will be decoupled and the desired stop angle then can be obtained by rotating the self-locking spring-bushing assembly around the hinge pin. After the desired stop angle is obtained, the C-spring is released back to the original position to couple with the adjacent hinge knuckle through the teeth and the stop angle is, then, fixed at the selected value.

FIG. 6 shows another physical feature of the stop and hold means where a pair of curved edges, 19 and 20, are formed on the adjacent hinge knuckles, 23 and 24, respectively. The curved edges, 19 and 20, and the hinge knuckles edges, 25 and 26, form an opening slot in between 19 and 20. The width of the opening slot is getting smaller as the pair of curved edges, 19 and 20, are approaching each other. The stop function of the universal stop hinge is performed as the pair of curved edges, 19 and 20, are in contact with each other.

When reflex points, 21 and 22, are formed at appropriate locations along the curved edges, 19 and 20, respectively in a manner that narrower channels are formed along the opening slot as defined by 19, 20, 25, and 26, the reflex points, 21 and 22, may induce stress and strain on each other as the universal hinge is being closed to a predetermined position where the reflex points start to be in contact. As the universal hinge is being closed further, the stress and strain is going higher until reaching a peak. Once the peak of stress and strain has been reached, the further movement of the hinge toward close position will have the stress and strain on the reflex points be gradually released until the universal hinge is stopped. Since a force needs to be applied to overcome the stress induced on the reflex points, 21 and 22, when the stopped universal hinge is to be opened, the hold function on the universal hinge is achieved through the induced stress and the strain over the reflex points. If a series of matching reflex points are formed along the pair of curved edges, a series of holding points can be implemented.

When the vertical step edge 16 and the bump 6 on the upper rim of the step-configured ring bushing and the vertical step edge 18 and the notch 5 on the hinge knuckle edge adjacent to the step-configured ring bushing as shown in FIG. 3 are replaced with a matching pair of curved edges having reflex points as illustrated in FIG. 6, the stop and hold angle of the universal hinge can be varied through the axial orientation change of the curved edge formed on the step-configured ring bushing by decoupling the step-configured ring bushing from the coupled hinge knuckle in a way as described above to have the step-configured ring bushing be able to be rotated around the hinge pin. Once the desired stop angle is reached, the step-configured ring bushing is coupled to the coupled hinge knuckle again to make the step-configured ring bushing behave like an extension of the coupled hinge knuckle and, hence, the stop function and the hold function can be implemented when the curved edge formed on the stepconfigured ring bushing and the curved edge formed on the adjacent hinge knuckle edge go across each other.

We claim:

1. An improved universal hinge for performing stop function with adjustable stop angles comprising a hinge body embodied with a self-locking spring-bushing assembly in between two hinge knuckles, which comprises a C-spring, which is a conically-shaped ring with an axial opening cut and with teeth formed on the radially wider rim, and a step-configured ring bushing which is a ring with a conical inner surface and two vertical step edges on the upper rim, in which said C-spring and said step-configured ring bushing are installed on the hinge pin in a way that said vertical step edges on said step-configured ring bushing are placed adjacent to a hinge knuckle having matching vertical step edges while said teeth on said C-spring are placed adjacent to the other hinge knuckle having matching teeth such that said conically-shaped outer surface of said C-spring is contacting and is being contracted in said conical inner surface of said step-configured ring bushing so that said step-configured ring bushing and said C-spring are pushed away from each other toward said adjacent hinge knuckles respectively to have said self-locking spring-bushing assembly couple to said other hinge knuckle adjacent to said C-spring through said teeth and hence, said self-locking spring-bushing assembly move's along with said other hinge knuckle adjacent to said C-spring and, then, said vertical step edges on said step-configured ring bushing and said adjacent hinge knuckle form a stop mechanism.

2. An improved universal hinge for performing stop function with adjustable stop angles as set forth in claim 1 wherein a matching bump and notch pair placed close to each of said vertical step edges respectively are formed to perform hold mechanism.

3. An improved universal hinge for performing stop and hold functions with adjustable stop angles comprising a hinge body embodied with a self-locking spring-bushing assembly, in between two hinge knuckles, which comprises a C-spring, which is a conically-shaped ring with an axial opening cut and with teeth formed on the radially wider rim, and a step-configured ring bushing, which is a ring with a conical inner surface and two curved edges on the upper rim, in which said C-spring and said step-configured ring bushing are installed on the hinge pin in a way that said curved edges on said step-configured ring bushing are placed adjacent to a hinge knuckle having matching curved edges while said teeth on said C-spring are placed adjacent to the other hinge knuckle having matching teeth such that said conically-shaped outer surface of said C-spring is contacting and is being contracted in said conical inner surface of said step-configured ring bushing so that said step-configured ring bushing and said C-spring are pushed away from each other toward said adjacent hinge knuckles respectively to have said self-locking spring-bushing assembly couple to said other hinge knuckle adjacent to said C-spring through said teeth and, hence, said self-locking spring-bushing assembly moves along with said other hinge knuckle adjacent to said C-spring whereby stop feature of said universal hinge is performed as said two curved edges go to in contact with each other and, at predetermined opening position of said universal hinge, hold feature of said universal hinge is performed as two reflex points on said pair of curved edges go across each other.

* * * * *